United States Patent
Welsh et al.

(10) Patent No.: US 8,159,411 B2
(45) Date of Patent: Apr. 17, 2012

(54) ROTARY CONNECTOR PROVIDING ELECTROMAGNETIC INTERFERENCE SHIELDING FEATURES

(75) Inventors: Robert L. Welsh, Narragansett, RI (US); Stacy E. Davis, Medway, MA (US); Timothy R. Hebert, Clinton, MA (US)

(73) Assignee: Raytheon Company, Waltham, MA (US)

( * ) Notice: Subject to any disclaimer, the term of this patent is extended or adjusted under 35 U.S.C. 154(b) by 440 days.

(21) Appl. No.: 12/481,879

(22) Filed: Jun. 10, 2009

(65) Prior Publication Data

US 2009/0315805 A1   Dec. 24, 2009

Related U.S. Application Data

(60) Provisional application No. 61/074,885, filed on Jun. 23, 2008.

(51) Int. Cl.
*H01Q 3/02* (2006.01)
*H01Q 3/00* (2006.01)

(52) U.S. Cl. ........ 343/882; 343/757; 343/765; 343/880; 343/906

(58) Field of Classification Search ........... 343/757, 343/765, 766, 878, 880, 882, 906
See application file for complete search history.

(56) References Cited

U.S. PATENT DOCUMENTS

| | | | |
|---|---|---|---|
| 4,225,868 A | 9/1980 | Mazur | |
| 4,749,821 A | 6/1988 | Linton et al. | |
| 5,105,054 A | 4/1992 | Kirma | |
| 5,353,200 A | 10/1994 | Bodin et al. | |
| 5,435,731 A | 7/1995 | Kang | |
| 5,798,910 A | 8/1998 | Holbeche et al. | |
| 6,188,300 B1 | 2/2001 | Rodeffer | |
| 6,297,969 B1 | 10/2001 | Mottahed | |
| 6,323,419 B1 | 11/2001 | Toy | |
| 6,987,492 B1 | 1/2006 | Buchanan et al. | |
| 7,372,428 B1 * | 5/2008 | King | 343/906 |
| 2005/0242910 A1 | 11/2005 | Balsells | |
| 2009/0315801 A1 | 12/2009 | Welsh et al. | |

FOREIGN PATENT DOCUMENTS

| | | |
|---|---|---|
| DE | 1591544 A1 | 9/1967 |
| DE | 3839929 A1 | 11/1988 |
| DE | 4425868 A | 1/1996 |
| EP | 1107377 A | 6/2001 |

(Continued)

OTHER PUBLICATIONS

Letter dated Aug. 27, 2010, re Examination Report dated Jun. 29, 2010 with replacement pages, GB Patent Application No. 0910487.8, 3 pages.

(Continued)

*Primary Examiner* — Hoang V Nguyen
(74) *Attorney, Agent, or Firm* — Daly, Crowley, Mofford & Durkee, LLP

(57) ABSTRACT

In one aspect, a rotary connector having a longitudinal axis includes a first metal portion including a groove about the longitudinal axis. The rotary connector also includes a second metal portion and a spring disposed in the groove and having metal contact with the first portion and the second portion. One of the first metal portion or the second metal portion is configured to rotate about the longitudinal axis and the other of the first metal portion or the second metal portion is configured to remain substantially rotationally fixed with respect to the longitudinal axis. The rotary connector may be used for electromagnetic interference (EMI) shielding with antenna pedestals.

9 Claims, 11 Drawing Sheets

FOREIGN PATENT DOCUMENTS

| | | |
|---|---|---|
| GB | 2461162 | 12/2009 |
| NL | 2003074 | 10/2010 |
| NL | 2003075 | 11/2010 |
| WO | WO 96/25083 | 8/1996 |
| WO | WO96/25083 A | 8/1996 |

OTHER PUBLICATIONS

Search Report and Written Opinion dated Jul. 22, 2010 from Patent Application in the Netherlands, Appl. No. 2003075 with English translation, 16 pages.

U.S. Appl. No. 12/481,882, filed Jun. 10, 2009.

Combined Examination and Search Report dated Sep. 17, 2009, Great Britain Appl. No. GB0910487.8, filed Jun. 17, 2009, 3 pages.

Combined Examination and Search Report dated Sep. 17, 2009, Great Britain Appl. No. GB0910486.80 filed Jun. 16, 2009, 4 pages.

P.E. Law Jr., "Shipboard Antennas—$2^{nd}$ Edition" (1986, Artech House, Inc.), Figs 2-118 and 2-122 2 pages.

Response to Office Action for Patent Application No. GB0910487.8, Response filed on Jun. 23, 2010.

Search Report dated Jun. 16, 2010 for Application No. GB0910487.8.

Report Concerning the Results of the Prior Art Search and Written Opinion issued by the Dutch Patent Office in connection with Patent Application No. 2003074, 15 pages.

* cited by examiner

ROTARY CONNECTOR PROVIDING ELECTROMAGNETIC INTERFERENCE SHIELDING FEATURES

RELATED APPLICATIONS

This application claims priority to provisional application Ser. No. 61/074,885, entitled "ANTENNA PEDESTAL INCLUDING A ROTARY CONNECTOR PROVIDING ELECTROMAGNETIC INTERFERENCE SHIELDING FEATURES," filed Jun. 23, 2008, which is incorporated herein in its entirety.

GOVERNMENT SPONSORED RESEARCH

This invention was made with Government support under Contract Number N00039-04-C-0012 awarded by the Department of the Navy. The United States Government has certain rights in the invention.

BACKGROUND

Electromagnetic interference (EMI) can cause disruption to electrical systems. One way to prevent EMI from affecting electronic circuitry is to shield the electronic circuit, a technique generally known as EMI shielding. Typically, EMI is performed by encasing the electronic components in metal having no gaps in the metal that would allow EMI to penetrate, for example, a Faraday cage. In general, a continuous metal contact is provided to ensure EMI shielding.

SUMMARY

In one aspect, a rotary connector having a longitudinal axis includes a first metal portion including a groove about the longitudinal axis. The rotary connector also includes a second metal portion and a spring disposed in the groove and having metal contact with the first metal portion and the second metal portion. One of the first metal portion or the second metal portion is configured to rotate about the longitudinal axis and the other of the first metal portion or the second metal portion is configured to remain substantially rotationally fixed with respect to the longitudinal axis.

In another aspect, an antenna pedestal includes a body having a cavity. The antenna pedestal also includes a rotary connector disposed in the cavity and having a longitudinal axis and includes a first metal portion that includes a groove about the longitudinal axis. The rotary connector also includes a second metal portion and a spring disposed in the groove and having metal contact with the first metal portion and the second metal portion. One of the first metal portion or the second metal portion is configured to rotate about the longitudinal axis and the other of the first metal portion or the metal second portion is configured to remain substantially rotationally fixed with respect to the longitudinal axis.

In another aspect, a rotary connector having a longitudinal axis includes a first metal portion comprising a first groove about the longitudinal axis and a second groove about the longitudinal axis, a second metal portion, a first metal spring disposed in the first groove and having metal contact with the first metal portion and the second metal portion and a second metal spring disposed in the second groove and having metal contact with the first metal portion and the second metal portion. One of the first metal portion or the second metal portion is configured to rotate about the longitudinal axis and the other of the first metal portion or the second metal portion is configured to remain substantially rotationally fixed with respect to the longitudinal axis.

DETAILED DESCRIPTION

Figure 1:
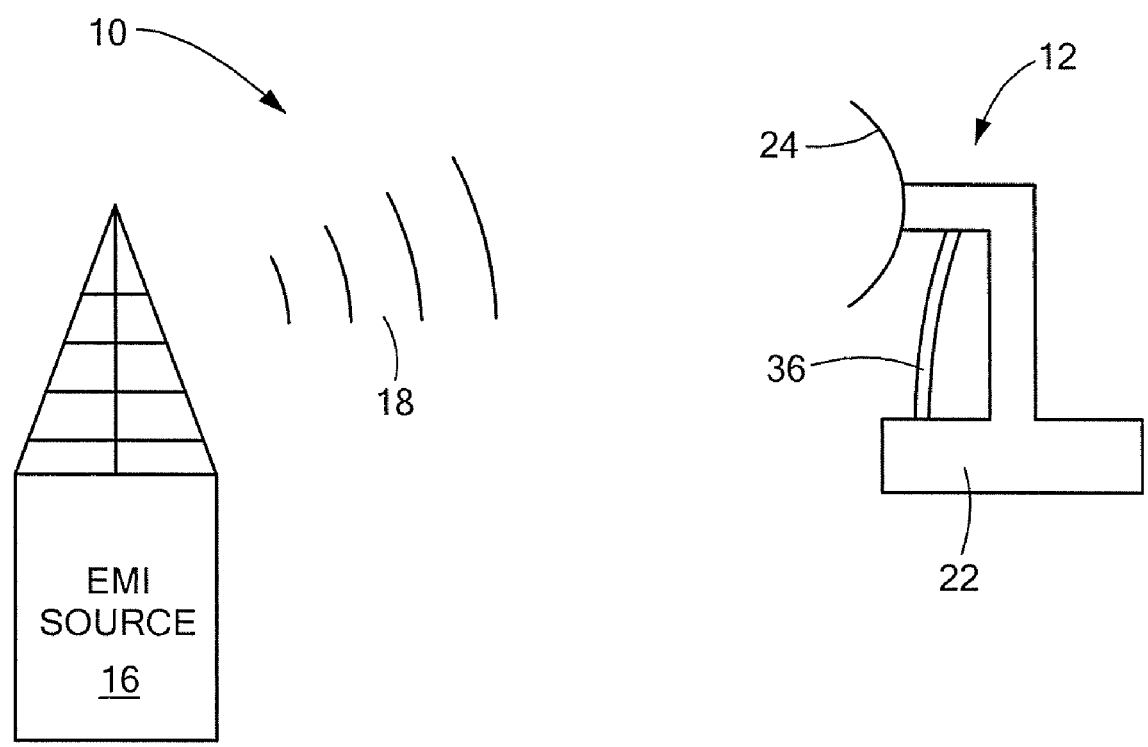
FIG. 1 is a prior art diagram of an environment of a radar system.

Referring to FIG. 1, in a signal environment 10, a system 12 may be susceptible to electromagnetic interference (EMI) 18 emanating from an EMI source 16. The system may be a radar system, a communications system and so forth. The EMI source may be a radar system, a communications system and so forth. In one particular environment, aboard a naval vessel, the EMI source may be a communications antenna in close proximity to the system 12. In one example, the system 12 includes an antenna 24 attached to the antenna pedestal 22 and cables 26 providing and receiving electrical signals with the system 12. The cables 26 may provide, for example, electrical signals to motors (not shown) that orientate the antenna 24 to point in various directions. In this configuration the cables 26 are exposed to EMI and the flow of the electrical signals may be disrupted. Therefore, the cables 26 providing the electrical signals to the system 12 are EMI shielded. One solution is to place the cables within the antenna pedestal 22. However, placing cables within the antenna pedestal 22 poses significant problems in that access to the cables 26 is limited in order to affect repairs, for example. Also, by being within the antenna pedestal 22 the cables 26 need to be able to move in at least two axes of rotation.

Figure 2:
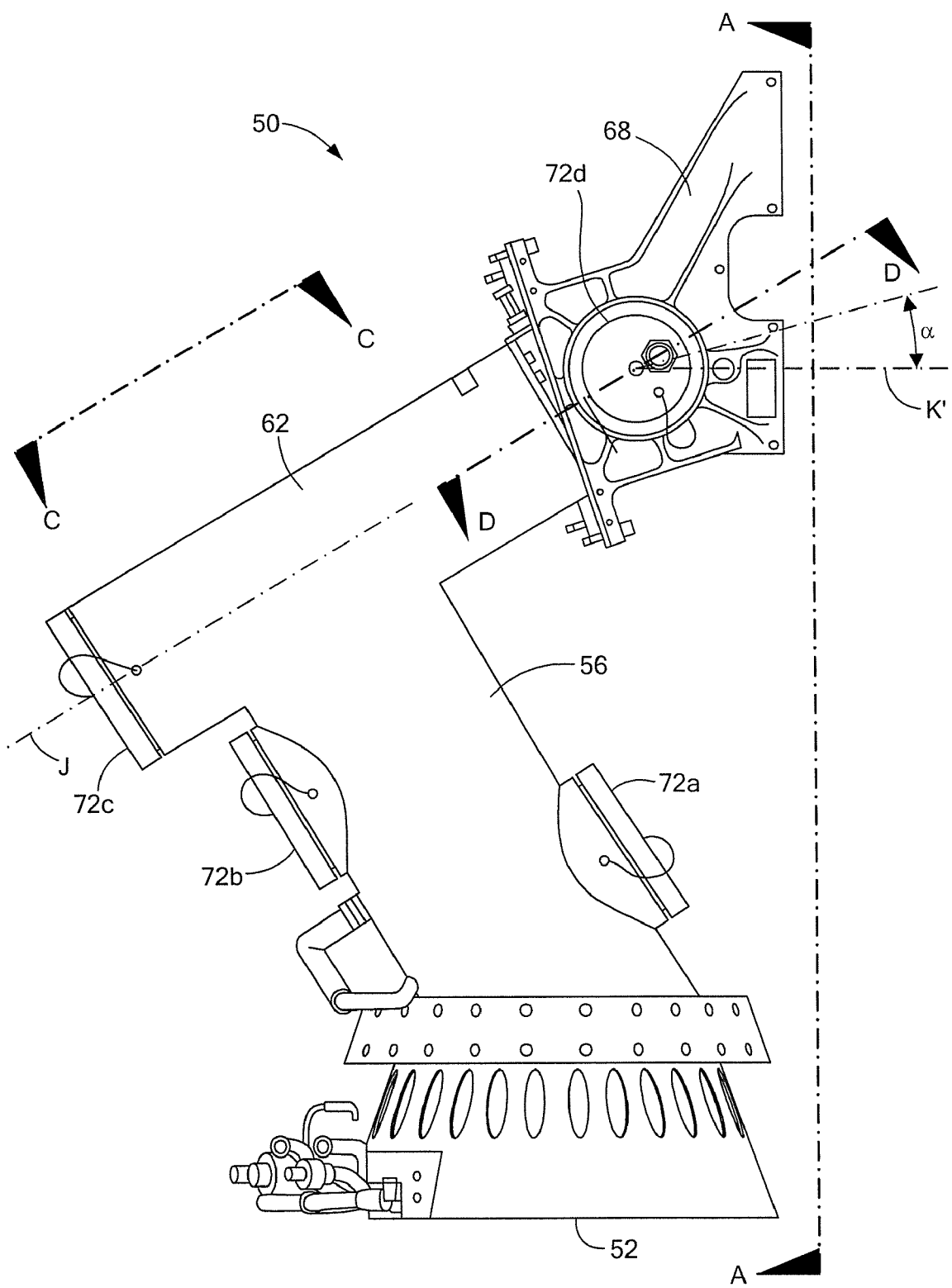
FIG. 2 is a side-view of an antenna pedestal.
Figure 3:
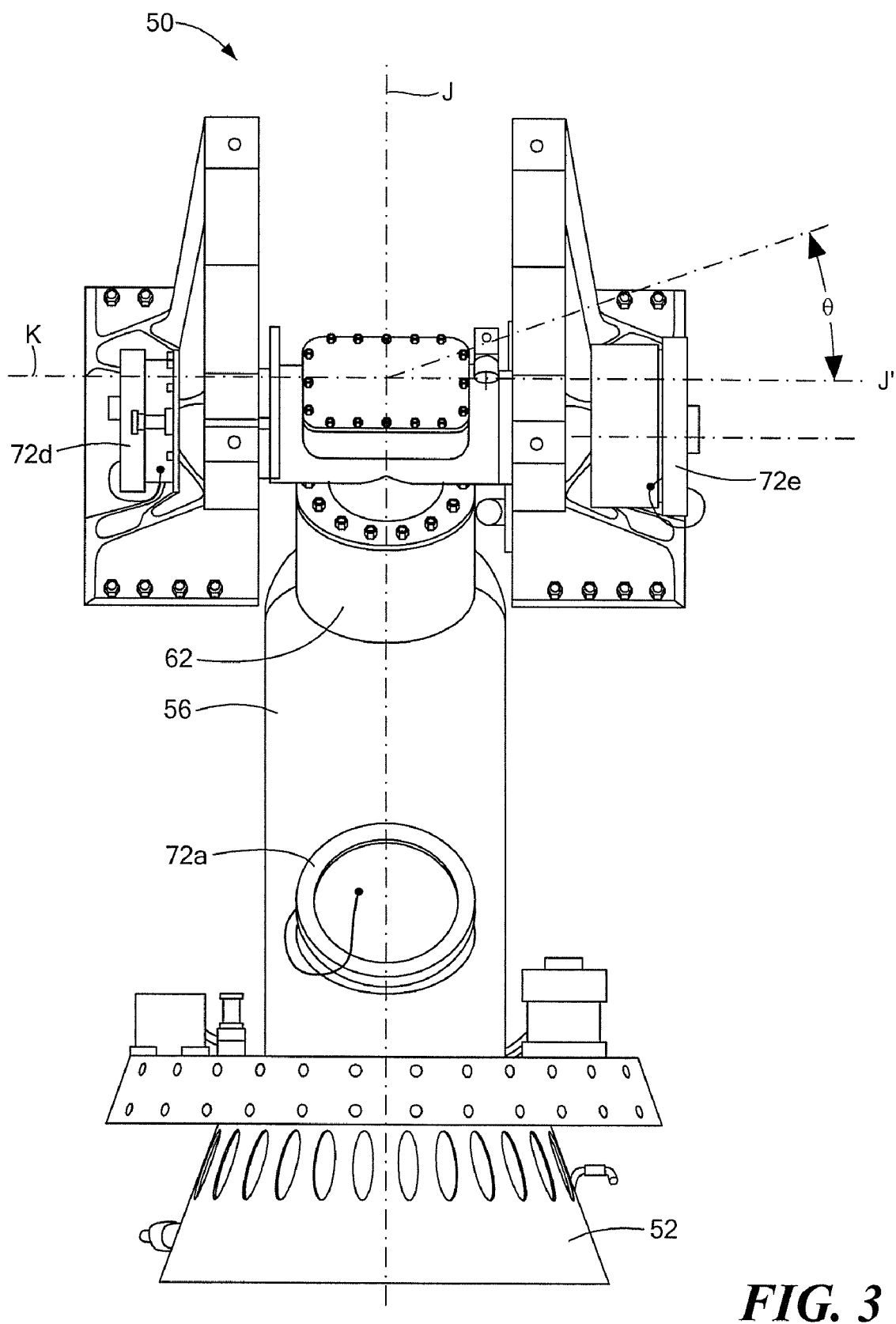
FIG. 3 is a diagram of an antenna pedestal of FIG. 2 taken along the reference line A-A.

Referring to FIGS. 2 and 3, an antenna pedestal 50 includes a base section 52, a trunk section 56, an arm section 62 and an antenna attachment section 68 for connecting to an antenna (not shown). The antenna pedestal 50 may move in at least two axes of rotation to orientate the antenna. For example, the arm section 62 is configured to rotate about an axis, J. The rotation about the J-axis forms an angle θ, which is measured from an axis J' that is perpendicular to the J-axis. In one example, θ ranges from −45° to 45° (90° total). The antenna attachment section 68 is configured to rotate about an axis K. The rotation about the K-axis forms an angle α, which is measured from an axis K' that is perpendicular to the K axis. In one example, α ranges from −30° to 120° (150° total).

The antenna pedestal 50 includes an inner cavity (an inner cavity 180 in FIG. 6) that is EMI shielded. For example, the base section 52, the trunk section 56, the arm section 62 and the antenna attachment section 68 form a continuous metal barrier protecting components within the inner cavity of the antenna pedestal 50 from EMI.

The antenna pedestal 50 includes a number of portal structures 72*a*-72*e* used to access components within the inner cavity 180 of the antenna pedestal 50 that contribute to EMI shielding. For example, the trunk section 56 includes the portal structures 72*a*, 72*b*, the arm section 62 includes the portal structure 72*c* and the antenna attachment section 68 includes the portal structures 72*d*, 72*e*.

Figure 4:
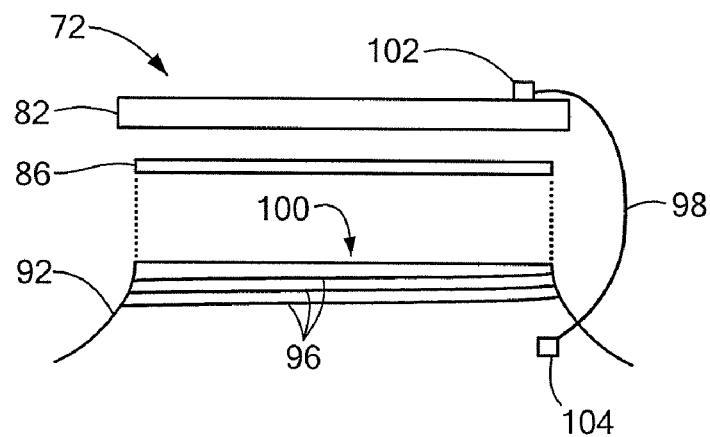
FIG. 4 is a diagram of a portal structure.

Referring to FIG. 4, the portal structure 72 includes a cover 82 having threads (not shown), a lid 86 including metal and a threaded structure 92 including threads 96 formed around a portal 100. The portal structure 72 also includes a wire 98 connected to the cover 82 by an anchor 102 and connected to the threaded structure 92 by an anchor 104. The lid 86 is shaped to completely cover the portal 100 to provide a continuous metal-to-metal contact for EMI shielding. In one example, the cover 82 and the threaded structure 92 are similar to a jar cover and jar arrangement (e.g., a BALL® Jar). For example, by screwing the cover 82 to the threaded structure 92, the lid 86 is held fixed to completely cover the portal 100 thereby forming an EMI shield. In other examples, the threaded structure 92 includes threads within an interior of the portal 100 while the cover 82 includes the threads 92 on its exterior (not shown). In one example, the lid 86 is made of a metal including a metal alloy. The threaded structure 92 being attached to the antenna pedestal 50 is also made of metal including a metal alloy to contribute to EMI shielding. Since the lid 86 completely covers the portal 100 and is contact with the threaded structure 92, there is not a requirement that the cover 82 be composed of metal. For example, the cover 82 including its threads (not shown) may be made of nylon. In other examples, the lid 86 is integrated with the cover 82 to form a single piece.

Figure 5A:
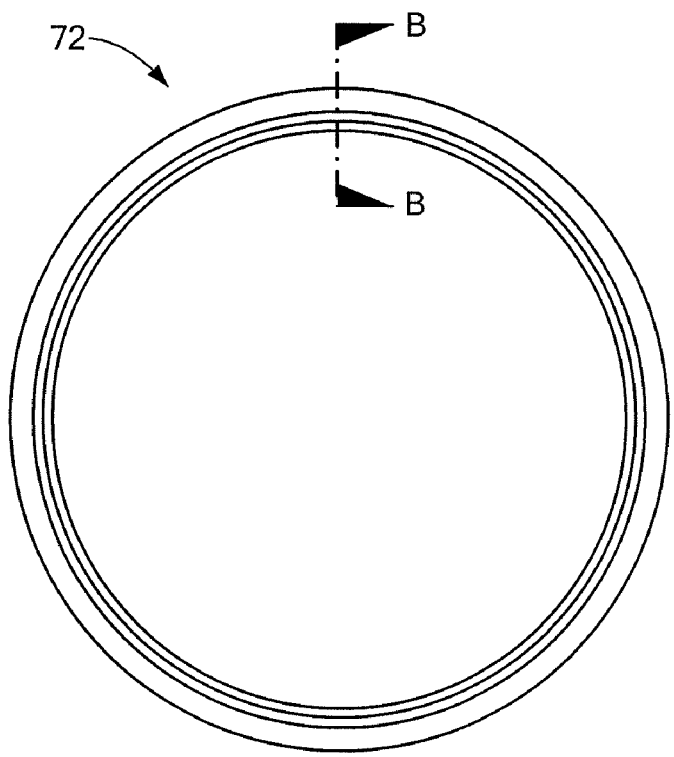
FIG. 5A is a top view of the portal structure.
Figure 5B:
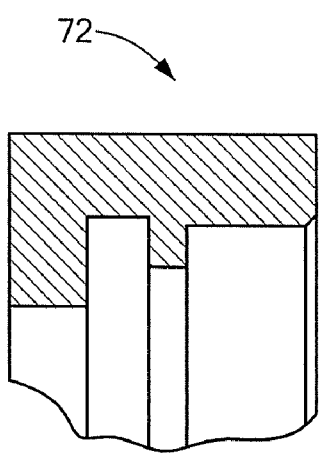
FIG. 5B is a cross-section view of the portal structure taken along the reference line B-B.

Prior art techniques of portal structures, used covers that required ten to twenty screws that took minutes to remove and replace. Because the screws were small, over time they were easily lost by technicians. By using the portal structure 72, technicians are able to access key components within the antenna pedestal 50 for maintenance or repair within seconds. FIG. 5A is a top view of the portal structure 72 and FIG. 5B is a cross-sectional view of the portal structure 72 taken along the reference line B-B.

Figure 6:
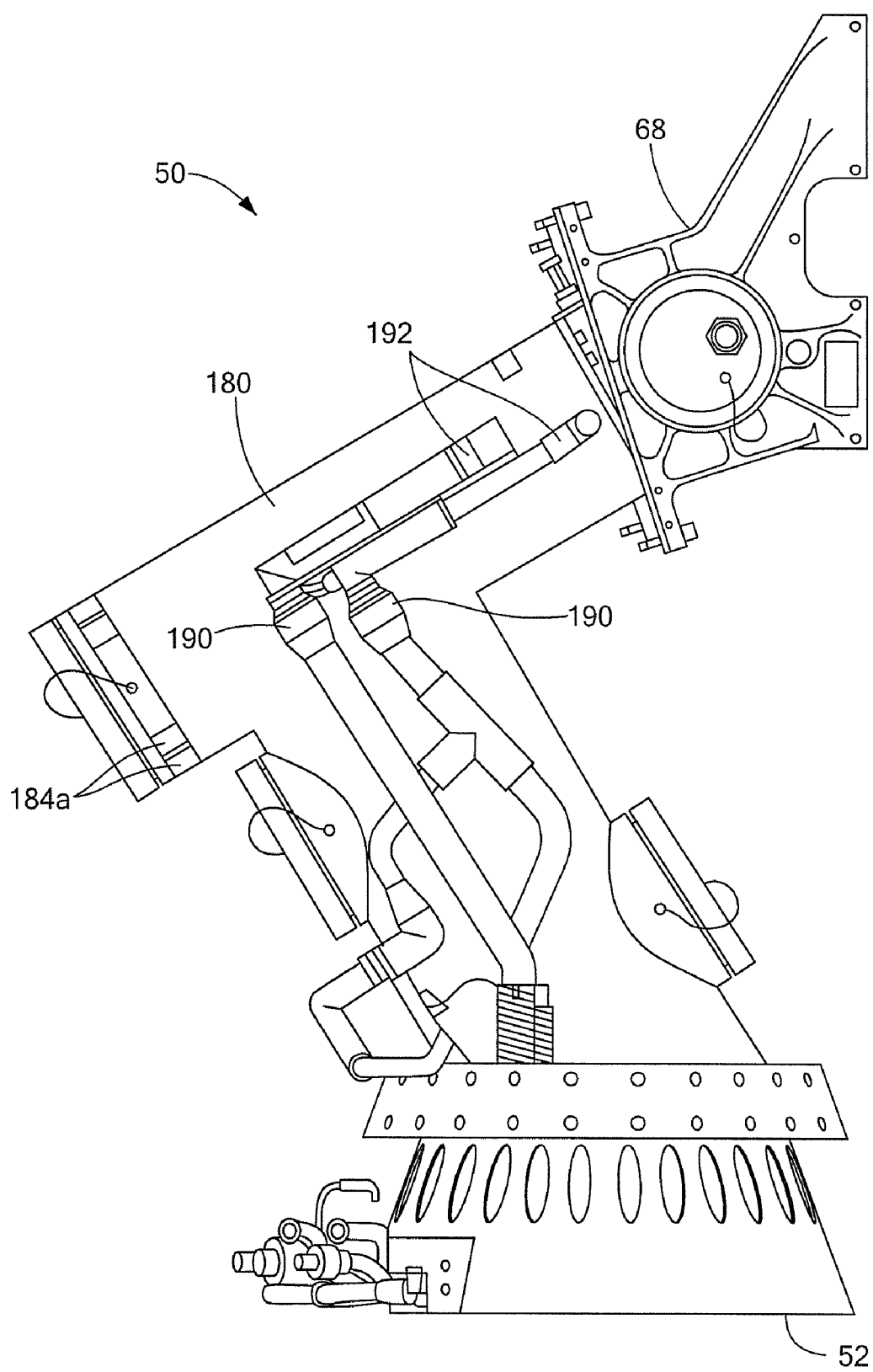
FIG. 6 is a view of an internal cavity of the antenna pedestal.
Figure 7:
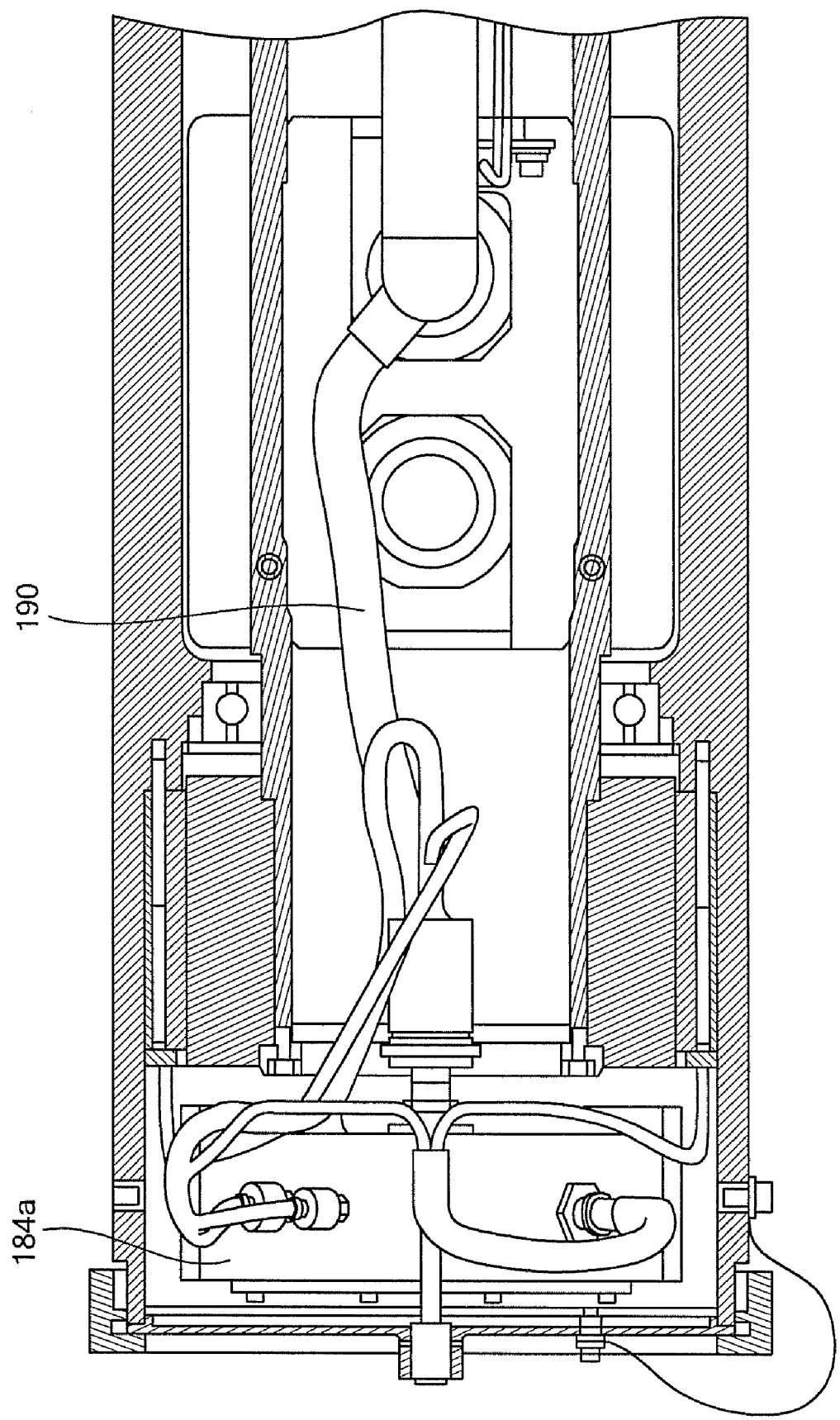
FIG. 7 is a cross-section view of the antenna pedestal of FIG. 2 taken along the reference line C-C.
Figure 8:
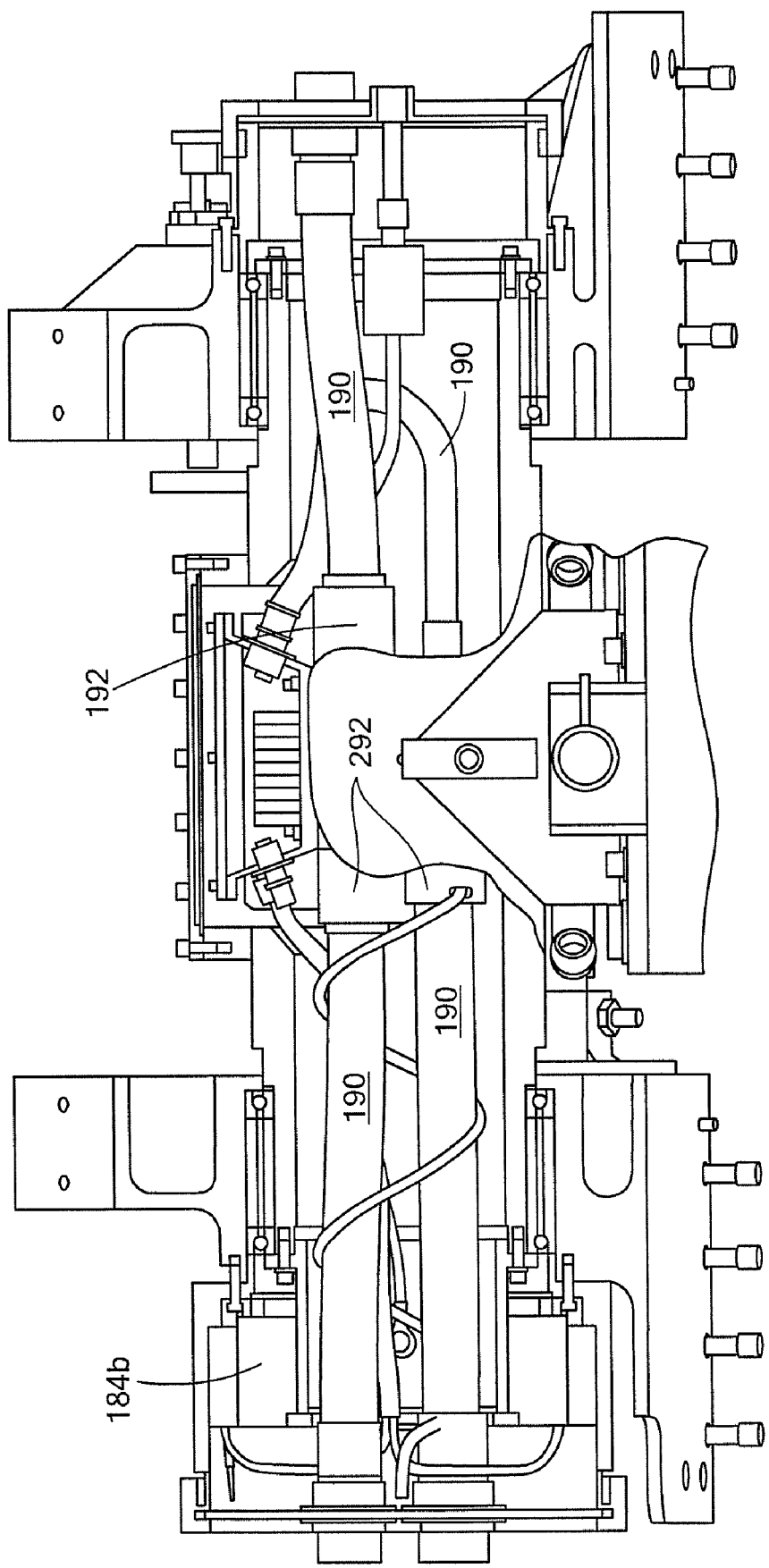
FIG. 8 is a cross-section view of the antenna pedestal of FIG. 2 taken along the reference line D-D.

Referring to FIGS. 6 to 8, within a cavity 180 of the antenna pedestal 50, rotary cables 190 run from the base 52 through the antenna attachment section 68 and contain wires (e.g., wires 200*a*-200*d* in FIG. 9) to carry signals to and from various electrical components within the antenna pedestal 50. For example, rotary cables 190 provide electrical signals to motor assemblies (e.g., a motor assembly 184*a* and a motor assembly 184*b*) that control rotation of the antenna about the J-axis and the K-axis. In one example, the motor assemblies 184*a*, 184*b* include an elevation motor along with a rotor and a stator. As will be shown, rotary connectors such as a rotary connector 192 (FIGS. 6, 8 and 10) and a rotary connector 292 (FIGS. 8, 12A and 12B), for example, allow portions of the rotary cables 190 to rotate to accommodate movements by the antenna pedestal 50 about the J-axis and the K-axis. In other examples, rotary connectors 392, 492 (FIGS. 13 and 14) may also be used.

Figure 9:
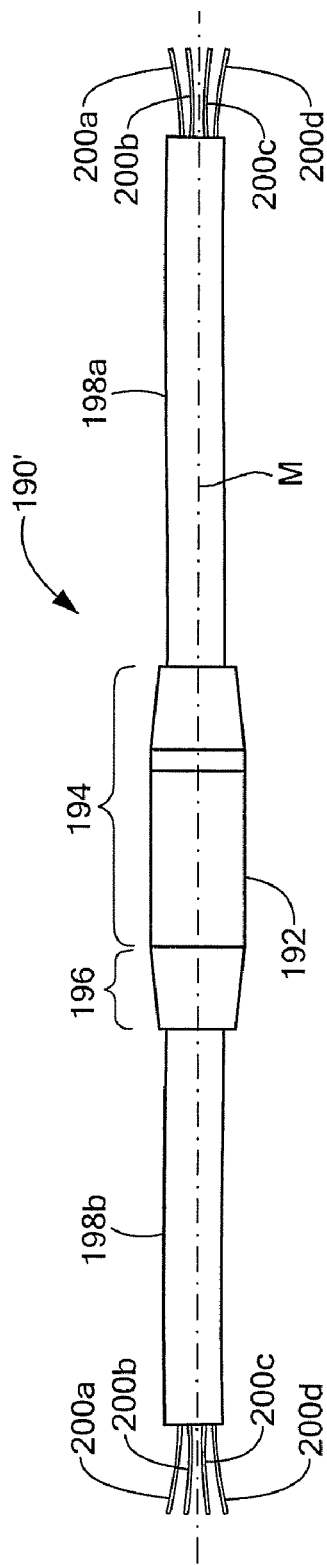
FIG. 9 is view of a rotary cable configuration.
Figure 10:
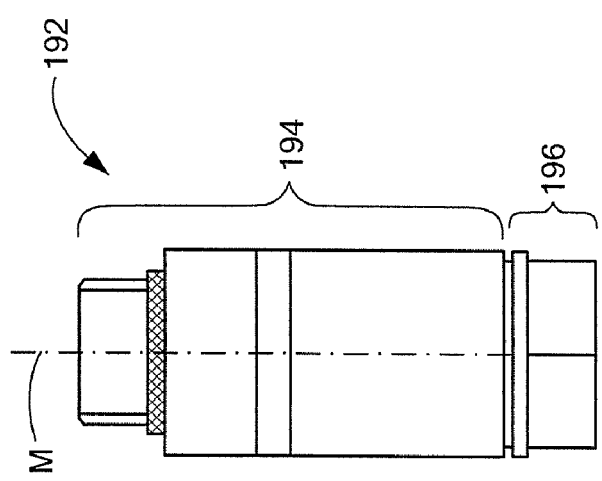
FIG. 10 is viewed of an example of a rotary connector.

Referring to FIGS. 9 and 10, one example of a rotary cable 190 is a rotary cable 190'. The rotary cable 190' includes the rotary connector 192 including a first connector portion 194, a second connector portion 196 and springs (e.g., a spring 210*a* and a spring 210*b* (FIG. 11C)). The rotary cable 190' also includes cable hoses 198*a*, 198*b*. The cable hose 198*a* is connected to the first connector portion 194 and the cable hose 198*b* is connected to the second connector portion 196. The cable hoses 198*a*, 198*b*, are similar to garden hoses except the cable hoses 198*a*, 198*b* are EMI shielded and carry wires instead of water. For example, cable hoses 198*a*, 198*b* are EMI shielded cable hoses that carry wires 200*a*-200*d*. In one example, wires 200*a*-200*d* supply power to the motor assemblies (e.g., the motor assemblies 184*a*, 184*b*) that rotate the antenna pedestal 50. Like garden hoses, cables hoses 198*a*, 198*b* individually cannot rotate more than a few degrees about their longitudinal axis M. However, as will be shown further below, the rotary connector 192 (FIG. 10) allows for rotation of one cable hose 198*a* or 198*b* about the longitudinal axis M while the other cable hose 198*b* or 198*a* remains substantially fixed with respect to the longitudinal axis M while ensuring that wires 200*a*-200*d* are EMI shielded.

Figure 11A:
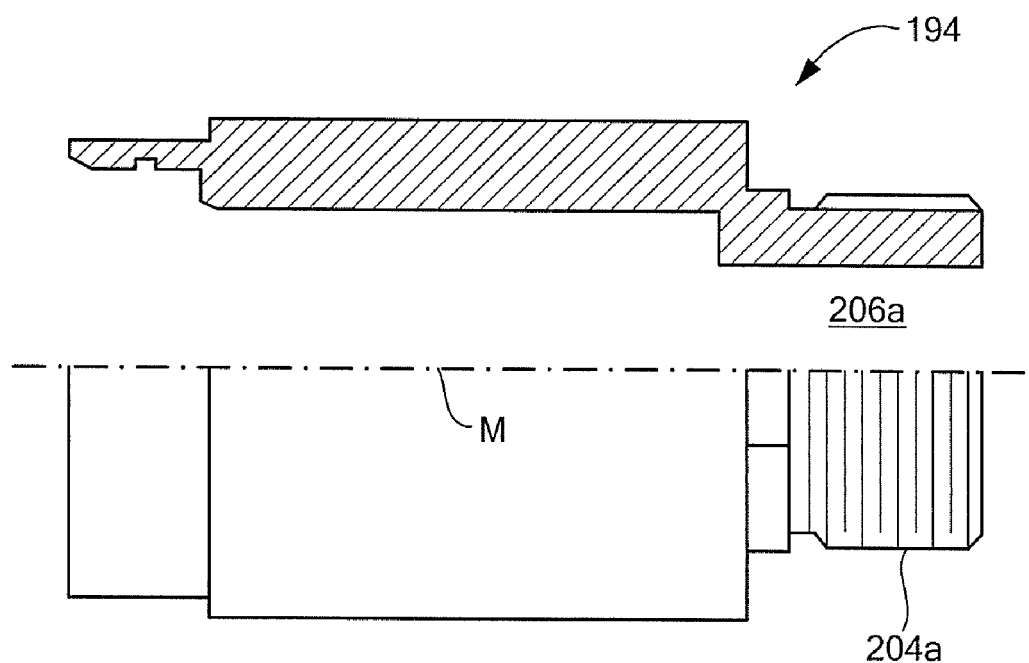
FIG. 11A is a partial cross-sectional view of a first connector portion.

Referring to FIG. 11A, the first connector portion 194 includes threads 204*a* for connection with the cable hose 198*a*. The first connector portion 194 is shaped to form a channel 206*a* to carry the wires 200*a*-200*d*.

Figure 11B:
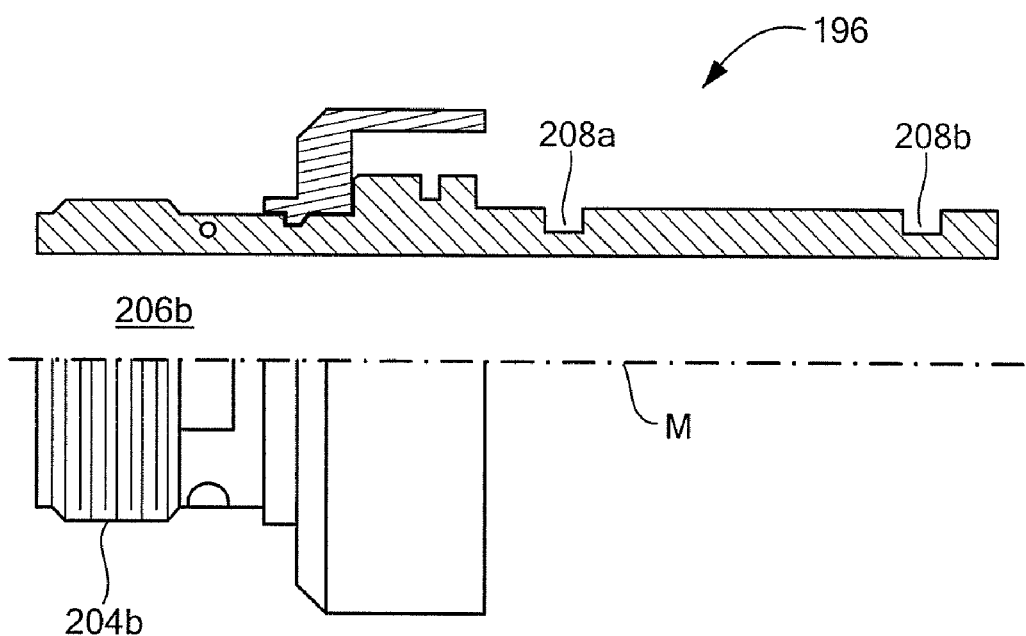
FIG. 11B is a partial cross-sectional view of a second connector portion.

Referring to FIG. 11B, the second connector 196 includes threads 204*b* for connection with the cable hose 198*b*. The second connector portion 196 is shaped to form a channel 206*b* to carry the wires 200*a*-200*d*. The second connector portion 196 is also shaped to form grooves (e.g., a groove 208*a* and a groove 208*b*). Each groove 208*a*, 208*b* runs in a concentric circle about longitudinal axis M.

Figure 11C:
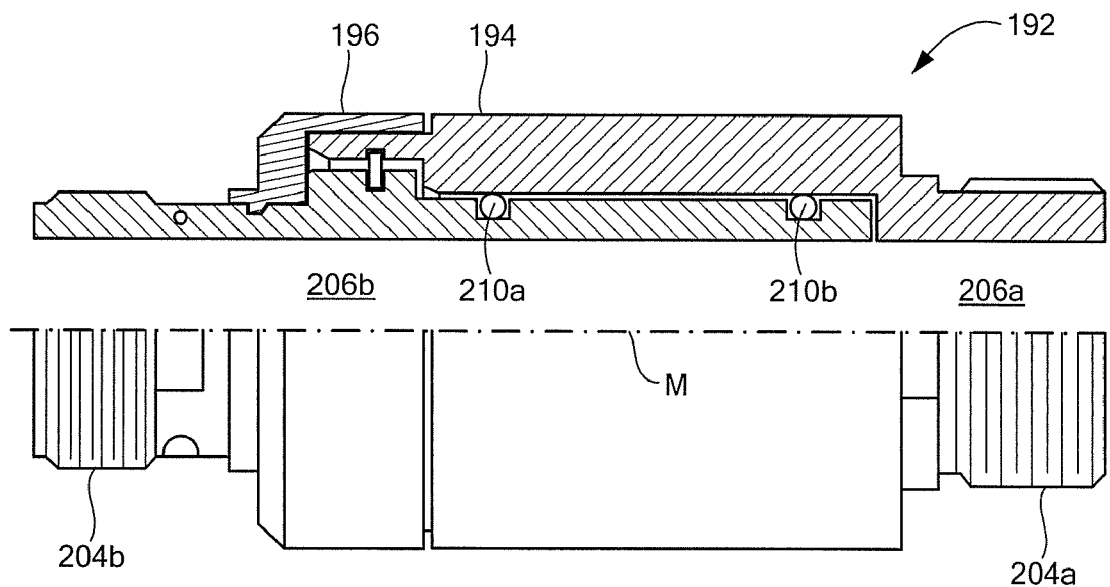
FIG. 11C is partial cross-sectional view of the rotary connector with the first connector portion separated from the second connector portion by springs.

Referring to FIG. 11C, the first connector portion 194 and the second connector portion 196 are separated by springs (e.g., a spring 210*a* and a spring 210*b*). The springs 210*a*, 210*b* ensures that at any point in time there is a continuous metal-to-metal contact between the first connector portion 194 and the second connector portion 196. In one example, the springs 210*a*, 210*b* include a metal. In one example, springs 210*a*, 210*b* include a metal alloy. In other examples, the springs 210*a*, 210*b* are made of beryllium copper.

In one example, the first connector portion 194 rotates about the longitudinal axis M while the second connector portion 196 is substantially fixed relative to the longitudinal axis M. In another example, the second connector portion 196 rotates about the longitudinal axis M while the first connector portion 194 is substantially fixed relative to the longitudinal axis M.

Figure 12A:
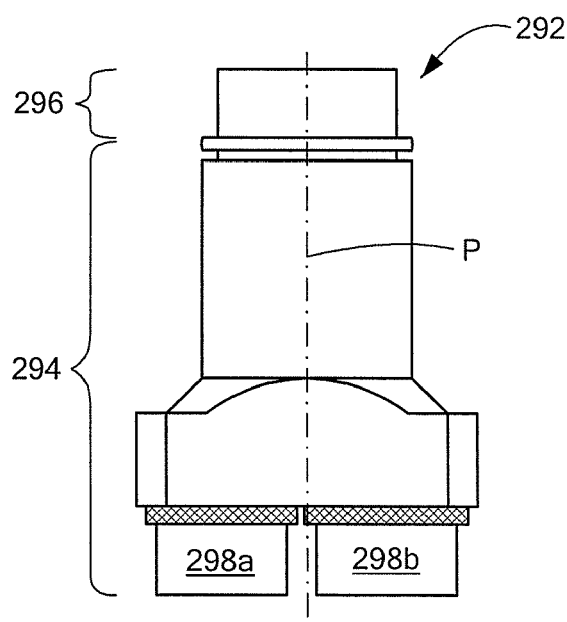
FIGS. 12A, 12B are views of another example of the rotary connector as a Y-connector
Figure 12B:
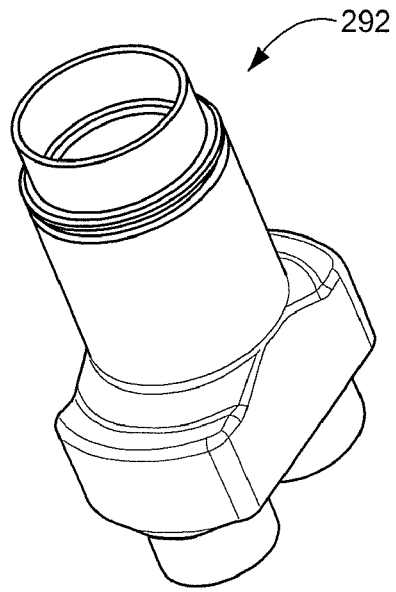

FIGS. 12A and 12B are views of another example of a rotary connector, a rotary connector 292. In this example, the rotary connector 292 is a Y-connector. The rotary connector 292 includes a first connector portion 294 and a second connector portion 296. The first connector portion 294 includes two ports (a port 298*a* and a port 298*b*) for connection to two cable hoses (not shown). In one example, the first connector portion 294 rotates about a longitudinal axis P while the second connector portion 296 is substantially fixed relative to the longitudinal axis P. In another example, the second connector portion 296 rotates about the longitudinal axis P while the first connector portion 294 is substantially fixed relative to the longitudinal axis P.

Figure 13:
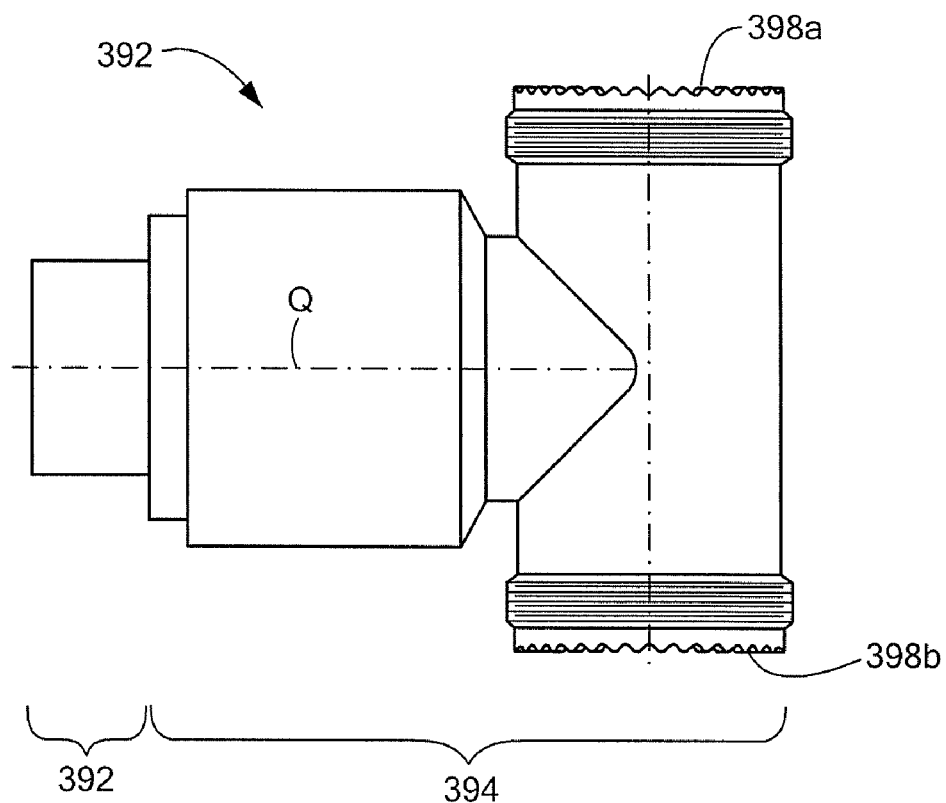
FIG. 13 is a view of further example of the rotary connector as a T-connector.

FIG. 13 is a view of further example of a rotary connector, a rotary connector 392. In this example, the rotary connector 392 is a T-connector. The rotary connector 392 includes a first connector portion 394 and a second connector portion 396. The first connector portion 394 includes two ports (a port 398a and a port 398b) for connection to two cable hoses (not shown). In one example, the first connector portion 394 rotates about a longitudinal axis Q while the second connector portion 396 is substantially fixed relative to the longitudinal axis P. In another example, the second connector portion 396 rotates about the longitudinal axis Q while the first connector portion 394 is substantially fixed relative to the longitudinal axis P.

Figure 14:
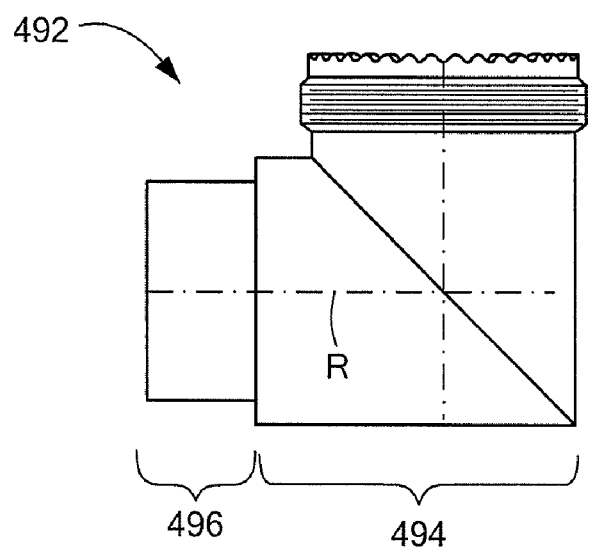
FIG. 14 is a view of a still further example of a rotary connector as an elbow connector.

FIG. 14 is a view of a still further example of a rotary connector as a rotary connector 492. In this example, the rotary connector 492 is an elbow connector. The rotary connector 492 includes a first connector portion 494 and a second connector portion 496. In one example, the first connector portion 494 rotates about a longitudinal axis R while the second connector portion 496 is substantially fixed relative to the longitudinal axis R. In another example, the second connector portion 496 rotates about the longitudinal axis R while the first connector portion 494 is substantially fixed relative to the longitudinal axis R.

Elements of different embodiments described herein may be combined to form other embodiments not specifically set forth above. Other embodiments not specifically described herein are also within the scope of the following claims.

What is claimed is:

1. An antenna pedestal comprising a body having a cavity and configured to rotate in at least two axes of rotation, comprising:
   a rotary connector disposed in the cavity and having a longitudinal axis comprising:
      a first metal portion comprising a groove about the longitudinal axis;
      a second metal portion;
      a spring disposed in the groove and having metal contact with the first metal portion and the metal second portion, wherein one of the first metal portion or the second metal portion is configured to rotate about the longitudinal axis and the other of the first metal portion or the second metal portion is configured to remain substantially rotationally fixed with respect to the longitudinal axis,
   a first cable hose connected to the first metal portion;
   a second cable hose connected to the second metal portion; and
   a wire extending through the first cable hose, the rotary connector and the second cable hose, the wire being configured to carry a signal that receives electromagnetic interference (EMI) shielding from the first cable hose, the second cable hose and the rotary connector,
   wherein the at least two axes of rotation comprises a first axis and a second axis, and
   wherein the antenna pedestal is configured to rotate 150° about the first axis while the wire remains substantially fixed.

2. The antenna pedestal of claim 1, further comprising:
   a motor configured to move the antenna pedestal and to receive power from the wire.

3. The antenna pedestal of claim 1 wherein the spring comprises a metal.

4. The antenna pedestal of claim 3 wherein the spring comprises beryllium copper.

5. The antenna pedestal of claim 1 wherein the rotary connector is configured to be one of a Y-connector, a T-connector and an elbow connector.

6. The antenna pedestal of claim 1 wherein the groove is a first groove and the spring is a first spring,
   wherein the first metal connector further comprises a second groove, and
   wherein the rotary connector further comprises a second spring disposed in the second groove and having metal contact with the first metal portion and the second metal portion.

7. The antenna pedestal of claim 1 wherein the rotary connector is a first connector and the wire is a first wire, and further comprising:
   a second rotary connector disposed in the cavity and substantially similar to the first rotary connector;
   a third cable hose connected to a first metal portion of the second rotary connector;
   a fourth cable hose connected to a second metal portion of the second rotary connector; and
   a second wire extending through the third cable hose, the second rotary connector and the fourth cable hose, the second wire being configured to carry a signal that receives electromagnetic interference (EMI) shielding from the third cable hose, the fourth cable hose and the second rotary connector;
   wherein the antenna pedestal is configured to rotate 90° about the second axis while the second wire remains fixed.

8. The antenna pedestal of claim 7, further comprising a first plurality of wires comprising the first wire,
   wherein the antenna pedestal is configured to rotate 150° about the first axis while the first plurality of wires remain substantially fixed, and
   the first plurality of wires receives electromagnetic interference (EMI) shielding from the first cable hose, the second cable hose and the rotary connector.

9. The antenna pedestal of claim 8, further comprising a second plurality of wires comprising the second wire,
   wherein the antenna pedestal is configured to rotate 90° about the second axis while the second plurality of wires remain substantially fixed, and
   wherein the second plurality of wires receives electromagnetic interference (EMI) shielding from the third cable hose, the fourth cable hose and the second rotary connector.

* * * * *